United States Patent [19]
van Goubergen

[11] Patent Number: 5,330,165
[45] Date of Patent: Jul. 19, 1994

[54] VIBRATION DAMPER

[76] Inventor: Willy van Goubergen, Viaduktstraat 131, 1040 Brussel, Belgium

[21] Appl. No.: 890,386

[22] Filed: May 26, 1992

Related U.S. Application Data

[63] Continuation of Ser. No. 647,766, Jan. 30, 1991, abandoned.

[30] Foreign Application Priority Data

Feb. 7, 1990 [NL] Netherlands ................ 9000294

[51] Int. Cl.$^5$ .................... F16F 1/36; F16F 3/08
[52] U.S. Cl. .................... 267/141; 267/141.1; 267/153; 248/633
[58] Field of Search ............. 267/141, 141.1, 153, 267/292, 294, 80, 137; 248/634, 633; 280/716; 52/167 RS, 167 RA, 167 E, 167 EA

[56] References Cited

U.S. PATENT DOCUMENTS

| | | |
|---|---|---|
| 2,457,706 | 9/1948 | Neher . |
| 2,686,667 | 8/1954 | Willison et al. .............. 267/153 |
| 2,819,063 | 1/1958 | Neidhart .................. 267/141 X |
| 3,125,330 | 3/1964 | Dye ....................... 267/153 |
| 3,436,042 | 4/1969 | Van Goubergen ........... 248/633 X |
| 3,546,055 | 12/1970 | Spertus ................... 267/141 X |
| 3,679,159 | 7/1972 | Bach et al. ............... 267/153 X |
| 4,002,315 | 1/1977 | Van Goubergen . |
| 4,273,213 | 6/1981 | Munz ..................... 248/633 X |
| 4,286,777 | 9/1981 | Brown .................. 267/141.1 X |
| 4,648,554 | 3/1987 | McQueen ................. 267/141 X |
| 4,684,010 | 8/1987 | Hutter et al. ............. 267/141 X |
| 4,880,214 | 11/1989 | Sukai .................... 267/153 X |

FOREIGN PATENT DOCUMENTS

| | | |
|---|---|---|
| 209280 | 1/1987 | European Pat. Off. . |
| 302126 | 8/1987 | European Pat. Off. . |
| 1986854 | 11/1967 | Fed. Rep. of Germany . |
| 2239048 | 2/1973 | Fed. Rep. of Germany ...... 267/141 |
| 2816616 | 10/1979 | Fed. Rep. of Germany . |
| 3334649 | 4/1985 | Fed. Rep. of Germany . |
| 91197 | 3/1968 | France . |
| 2148355 | 3/1973 | France . |
| 2158775 | 6/1973 | France . |
| 2348402 | 11/1977 | France . |
| 2642490 | 8/1990 | France . |
| 128238 | 9/1969 | Netherlands . |
| 140465 | 6/1921 | United Kingdom ............ 267/141.1 |
| 729022 | 4/1955 | United Kingdom ............... 267/292 |
| 2149056 | 6/1985 | United Kingdom ............... 267/292 |

*Primary Examiner*—Andres Kashnikow
*Assistant Examiner*—Kevin D. Rutherford
*Attorney, Agent, or Firm*—Hoffmann & Baron

[57] ABSTRACT

The invention relates to a vibration damper consisting only of elastomeric parts of different hardnesses without any metal parts and comprising basically a layer of laterally spaced bodies (1) in the form of spheres, cubes, diamond studs, pyramids or the like distinct bodies, said layer of bodies (1) being sandwiched between two plate elements (2) of a harder elastomer than that of the said bodies (1), wherein the facing sides of the layer and the plate elements are geared to one another in such a way that the contact between them is limited to point-shaped or at the most line-shaped places of contact and for the rest the softer elastomeric bodies (1) are substantially freely deformable. In a preferred embodiment of the invention (FIGS. 6 and 8) the plate elements (2e) are provided on the sides facing away from the softer elastomeric bodies (1) with projections (9, 9a) which projections can deform and bend under vibratory loads and the pattern of projections (9, 9a) is such in relation to the position of the elastomeric bodies (1) that vibrations acting on the highest projections (9, 9a) are forced to travel along a curved path (19) through the said elastomeric bodies (1) and the energy thereof is absorbed in the damper.

19 Claims, 3 Drawing Sheets

VIBRATION DAMPER

This is a continuation of copending application(s) Ser. No. 07/647,766 filed on Jan. 30, 1991 now abandoned.

The invention relates to a vibration damper, exclusively comprising elastomeric parts of different hardnesses, without metal elements.

There are known vibration dampers in the form of a laminate of, for example, felt, rubber, cork, nylon, polyurethane foam, hard foam and similar materials, in different combinations. The object of such laminates is to make use of the self-damping properties of the different materials and by combining these to obtain optimum damping characteristics for a particular application.

A disadvantage of laminates is that their manufacture is complicated because a good bond between the component layers is required. Another disadvantage of laminates is that, in order to change the damping characteristics, for example for adaptation to a change in occurring vibrations, the entire laminate must be replaced by another laminate.

There are also known vibration dampers which are formed at least partly by a vibration damping plate of self-damping material which on both sides has projecting studs with flat support faces parallel to the plate surfaces. Such self-damping plate material is known from Dutch patent No. 128,238.

In this known material, marketed under the name of RUBLOC®, the studs are arranged in groups, each group comprising a series of studs with different heights and/or different diameters. Equal studs on opposite sides of the plate are off-set relative to one another.

The working principle of the RUBLOC® material is that as the strength of the vibrations generated by an apparatus which is supported by a layer of such damping material increases, more studs become involved in the vibration damping, thus achieving a progressive damping. By means of the off-set position of equal studs on opposite sides of the plate it is achieved that vibrations are not transferred perpendicularly to the plate from one stud to an opposite stud, but are forced to follow a longer, sloping or bent path, which extends partly horizontally through the web of the plate. Since the studs carrying an object can also deflect laterally, an object supported by a RUBLOC® plate is prevented from slipping laterally.

A general observation with regard to the RUBLOC® vibration damper is that interengaging parts of successive plates, or parts of the RUBLOC® vibration damper engaging objects to be insulated, which are supported by the vibration damper, interengage through flat surfaces, such as the end faces of the studs.

The present invention relates to a laminated vibration damper, exclusively comprising elastomeric parts of different hardnesses, without metal elements, in which the advantages of known laminate structures are made use of, namely the possibility of combining different damping materials, but the disadvantages of laminates mentioned above are avoided, and in which the self-damping properties of rubber or like elastomeric material can be used in the same way as in the RUBLOC® material, i.e., that with increasing vibratory load more self-damping material becomes involved in the vibration damping.

The vibration damper according to the invention comprises at least one layer of elastomeric bodies which within said layer are longitudinally and transversely spaced, and when subjected to a load, can each be deformed substantially independently from the other or others, said layer being sandwiched between two elastomeric plate elements, and in which the internal elastomeric bodies, through being less hard and/or through their shape, are more easily deformable than the elastomeric plate elements and lateral movement of the internal layer or layers between the plate elements is prevented, the facing sides of the layer or layers of elastomeric bodies and of the elastomeric plate elements being geared to one another in such a way that the contact between them is limited to point-shaped or at most line-shaped places of contact and for the rest the elastomeric bodies being substantially freely deformable.

The elastomeric bodies in the inner layer of the vibration dampener of the invention could for instance be spheres, cubes, diamond studs, pyramids or similar distinct bodies, different from ridges, ramps or similar configurations having a main longitudinal dimension.

In this way layers of preferably interconnected elastomeric bodies can be exchangeably sandwiched between plate elements, and the assembly of these internal bodies and the two plate elements forms a layered, plate-shaped vibration damper, comparable to a laminate, of which the components, however, are easily exchangeable. Elastomeric bodies can be replaced by elastomeric bodies with a different shape and/or a different hardness to adapt to vibrations with a changed intensity and/or frequency. To facilitate handling the elastomeric bodies they may be interconnected to form a mat by means of a thin layer of material or thin strips which do not influence the deforming behaviour of the separate elements.

Apart from the exchangeability of the layer of internal elastomeric bodies the energy-absorbing capacity of the elastomeric bodies is utilized more effectively than with known laminates and also more effectively than with RUBLOC® material. The invention is based on the insight that the energy-absorbing capacity of an elastomeric body can be increased by reducing the contact of the elastomeric body with other objects to a minimum.

Because the facing sides of the layer or layers of elastomeric bodies and of the elastomeric plate elements are geared to one another in such a way that the contact between them is limited to point-shaped or at most line-shaped places of contact and for the rest the elastomeric bodies are substantially freely deformable, maximum use is made of the resiliently deforming capacity of an elastomer for absorbing vibratory energy.

While in a known laminate in particular the middle layer cannot be deformed independently of the other or others at all, and in the RUBLOC® plates the studs support an object through their flat end faces and are thus slightly hindered in their deformation, in principle this is not or hardly the case in the elastomeric internal bodies according to the invention. The vibration damper according to the invention really makes maximum use of the resiliently deforming capacity of the elastomeric material and, indeed, experiments have shown that higher vertical damping is possible than in comparable vibration dampers in which the material deforming through a periodically exerted load is more enclosed, in which latter case the lateral stability will be higher.

In the simplest embodiment of the invention the plate elements may be designed with smooth, facing surfaces and with peripheral flanges which, when the elastomeric elements are between them, are at a distance from one another. These flanges prevent the lateral egress of the elastomeric bodies and prevent these, softer, bodies from becoming loaded too heavily by reducing the mutual approach of the covers. The flanges also form a protection against the ingress of dust which may have a negative effect on the operation of the damper.

In order to provide for lateral damping as well, while maintaining as much free deformability of the elastomer as possible, the elastomeric plate elements, according to the invention, may be provided with recesses for receiving elastomeric bodies on the side facing the adjoining layer of elastomeric bodies, and there may be provided free spaces adjoining each place of contact with a volume increasing from the place of contact.

When under an exclusively vertical load, at least a load perpendicular to the plane of the vibration damper, each of the elastomeric bodies will be freely deformable. For example, spherical elastomeric bodies can be flattened perpendicularly to the direction of the compression into ellipsoid solids of revolution, whereby the contact point at the top and bottom ends of the vertical axis changes into a small surface-to-surface contact. Except for these contacting surfaces with small dimensions the spherical elastomeric bodies are freely deformable.

If the load has a component in the plane of the vibration damper, each spherical elastomeric element, in addition to the symmetrical deformation described above, will also undergo a lopsided deformation, but the latter deformation also has a high degree of freedom owing to the presence of the free spaces with a volume increasing from the places of contact mentioned above. A vibration component in the plane of the damper can also be damped virtually exclusively by the deformation of the elastomeric bodies. Only when the lateral component becomes excessive will the further lateral movements be progressively checked through the contact between the elastomeric bodies and the walls of the recesses.

According to the invention the free spaces of which the volume increases from each place of contact can be formed, in the case where at least at the places of contact the recesses in the elastomeric plate elements and the elastomeric bodies each have the shape of parts of solids of revolution, through the generatrices of the respective solids of revolution enclosing different angles with a plane parallel to the layer of elastomeric elements at the places of contact. For example, the generatrix of each recess may be an ellipsoid and the generatrix of each elastomeric body may be a circle.

In all these embodiments it is achieved that the elastomeric bodies can freely undergo their maximum lateral deformation when under a vertical load, before completely filling the recesses in the plate elements, which implies that the maximum damping capacity of the elastomeric bodies is utilized.

Although spherical elastomeric bodies have the highest damping capacity, nevertheless a high damping effect is also achieved with non-spherical elastomeric bodies, as long as it is ensured that each elastomeric body is—as much as possible—free to deform elastically.

It is possible, through an effective selection of the shape of the cooperating surfaces of the elastomeric bodies and of the elastomeric plate elements, to obtain damping characteristics which are the most suitable for a certain use. These damping characteristics can almost fully be determined by the shape and the size and by the material of the elastomeric bodies, while the elastomeric plate elements may be dishes or covers made of an elastomer having a higher hardness than the elastomeric elements.

In a further elaboration of the invention, the elastomeric plate elements may be provided on the sides away from the elastomeric bodies, with projections which themselves can deform and bend under vibratory loads.

The projections may be parts of spheres or cylindrical or prismatic studs with flat end faces, which are arranged in groups, each group having projections of different heights and diameters. In other words, the plate elements may be modified RUBLOC® plates in the sense that, instead of both plates being provided with projections, the projections are only present on one of the surfaces and the other surface is designed with recesses for receiving elastomeric bodies. In such a vibration damper the softer elastomeric bodies will first receive the lower amplitude vibrations, while the harder dishes will damp the higher amplitude vibrations after the softer bodies have been maximally compressed. Thus the damping is switched from the softer elastomeric bodies to the harder dishes, in particular the studs thereof.

A particularly advantageous embodiment is one in which the stud pattern is positioned in relation to the subjacent recesses in such a way that the higher studs are laterally off-set relative to the elastomeric bodies, so that the vibrations acting on said higher studs are forced to travel along a curved path through the elastomeric bodies into the vibration damper (see arrows 19 in FIGS. 6 and 8).

When elastomeric bodies are combined to form mats it is also easier to sandwich between elastomeric plate elements a plurality of layers of elastomeric bodies positioned one on top of the other or others, thereby to realise different spring characteristics. It is observed that with spherical elastomeric bodies these layers should be off-set in such a way that the interengaging spheres in the resulting stack of spheres only make point contact.

In an alternative embodiment of the invention the elastomeric bodies may be present in the vibration damper not as loose elements butting against separate plate elements, but the vibration damping may comprise an assembly of plate elements of elastomeric material, with elastomeric bodies projecting from one side of each plate, and recesses being formed on the other side. If the configurations of the various projections and recesses are geared to one another in such a way that there are free spaces adjoining each place of contact with a volume increasing from the place of contact, the same, or at least comparable favourable damping properties can be obtained as with the embodiments described above.

In illustration of the invention, some embodiments of the vibration damper will be described, by way of example, with reference to the accompanying drawings.

Figure 1:
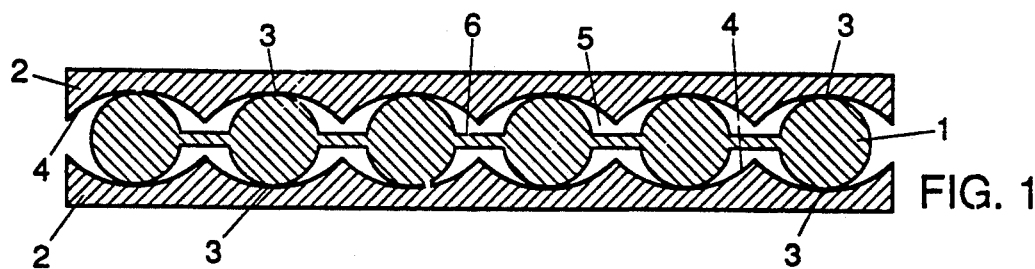
FIGS. 1-8 are cross-sectional views of different vibration dampers comprising at least three layers.

According to the drawings, in particular FIG. 1, a vibration damper according to the invention comprises a layer of elastomeric bodies 1, with elastomeric plate elements 2 on both sides, said plate elements in general having a higher hardness than the elastomer of bodies 1. In the embodiment of FIG. 1 the elastomeric bodies are substantially spherical and they are received in recesses 4 in the plate elements, which will be referred to hereinafter as dishes or covers 2, said recesses 4 in this embodiment having the shape of a part of an ellipsoid solid of revolution.

Figure 1A:
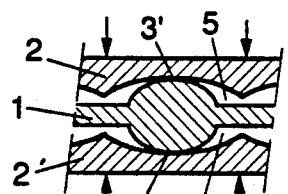
FIG. 1A shows a detail of the vibration damper illustrated in FIG. 1, when subjected to a load.

The mutual contact between elastomeric bodies 1 and recesses 4 is in unloaded position reduced to two basically point-shaped places of contact 3, which with a vertical load on covers 2 will be slightly increased to small surfaces of contact 3', as shown in FIG. 1A. The spherical elastomeric bodies are allowed to deform substantially freely into ellipsoid solids of revolution (flattened spheres) in the space between opposite recesses 4, through the presence of free spaces 5 surrounding places of contact 3, 3'. When the vertical load is released the flattened spheres can spring back, again freely, to the spherical shapes. The spheres 1 will then not be hindered by the thin bands or strips of material 6 shown in FIG. 1, which connect adjoining spheres into a mat, which facilitates the manipulation of the spheres in assembling a vibration damper.

The recesses 4 here also provide for the limitation of the relative lateral movements of the covers 1, thus preventing the lateral slipping of the interposed elastomeric bodies 1.

Figure 2:
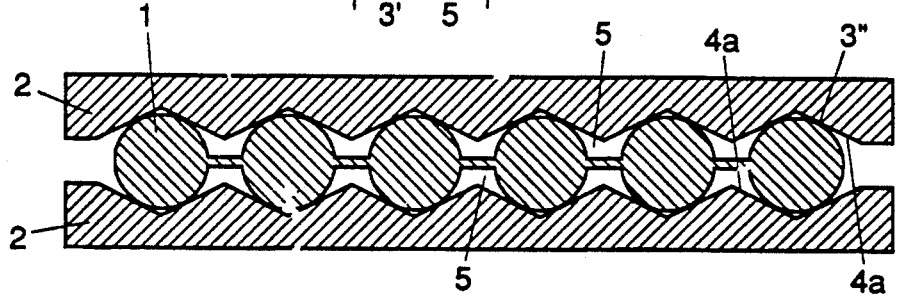

The embodiment according to FIG. 2 differs from that in FIG. 1 in that recesses 4a have a conical shape, in general the shape of a surface of revolution of which the generatrix shows a bend. In this embodiment the contact between each of the spherical elastomeric bodies 1 and the recesses 4a is along a circle 3''. Although it is true that there is more contact here, namely linear contact 3'' than with the point contact 3' in the embodiment according to FIG. 1, there are still free spaces adjoining the places of contact, having an increasing volume from the places of contact 3''.

For that matter FIG. 2 can also represent recesses in the shape of a polyhedron, in particular a pyramid, so that the contact between elastomeric bodies 1 and recesses 4a is limited to spaced points of contact 3''.

Figure 3:
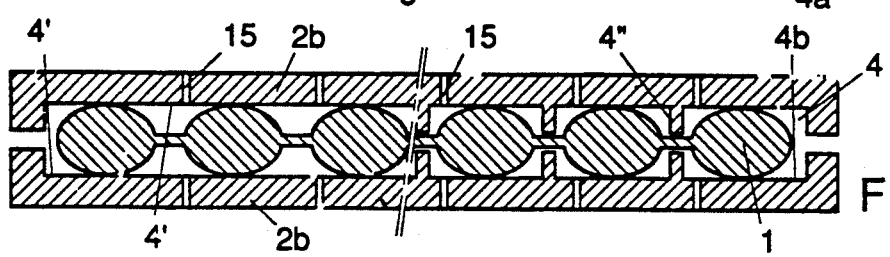

In the embodiment shown in FIG. 3, the elastomeric bodies 1 are shown in somewhat loaded form. In the left-hand part of this figure the covers 2b are formed with a flat bottom 4', and in the right-hand part partitions 4'' define recesses 4 with flat bottoms 4b.

Figure 4:
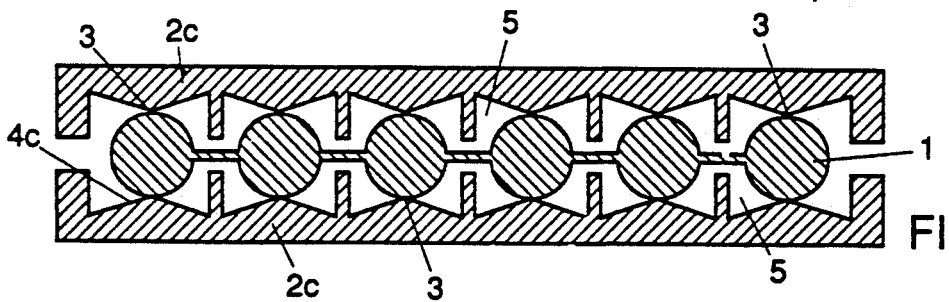

According to FIG. 4 the bottoms of the recesses 4c in the dishes 2c can have the shape of pyramids or cones, with the apex being directed towards elastomeric bodies 1. This embodiment best shows the presence of free spaces around the places of contact 3, which free spaces 5 have a volume which increases from the places of contact 3.

Figure 5:
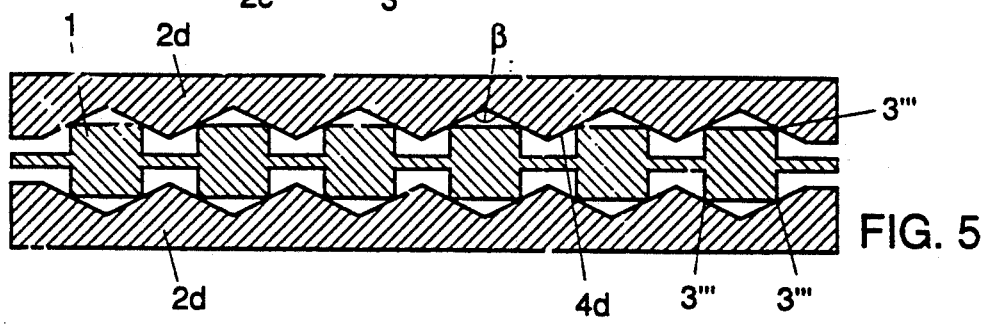

FIG. 5 shows elastomeric bodies 1 in the shape of cubes. If the recesses 4d in the dishes 2d are bounded by a conical plane with an apical angle $\beta$, the contact is limited to points 3''' at the corners of each cube 1.

Figure 6:
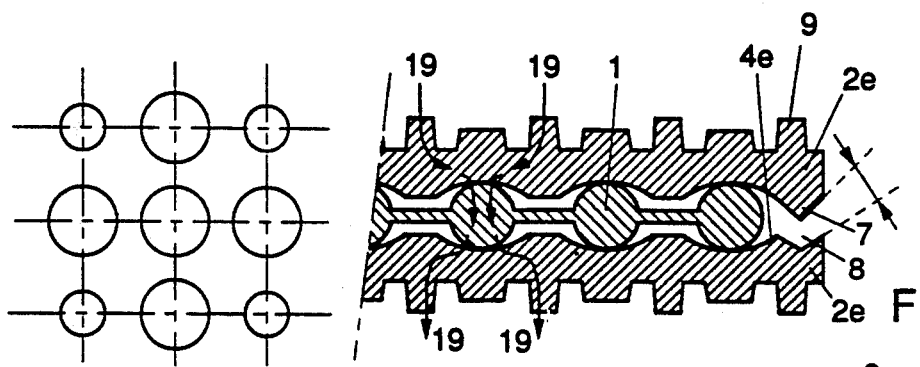
Figure 7:
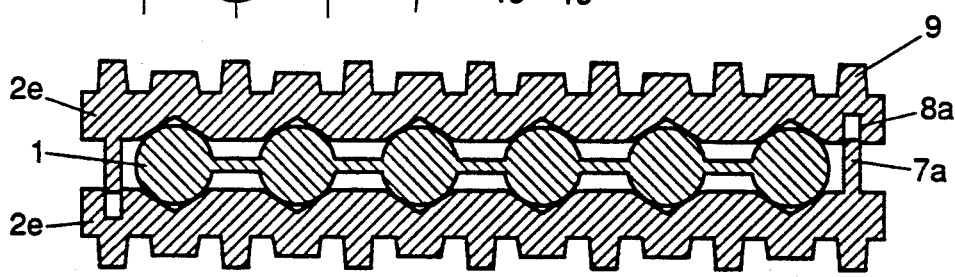
Figure 8:
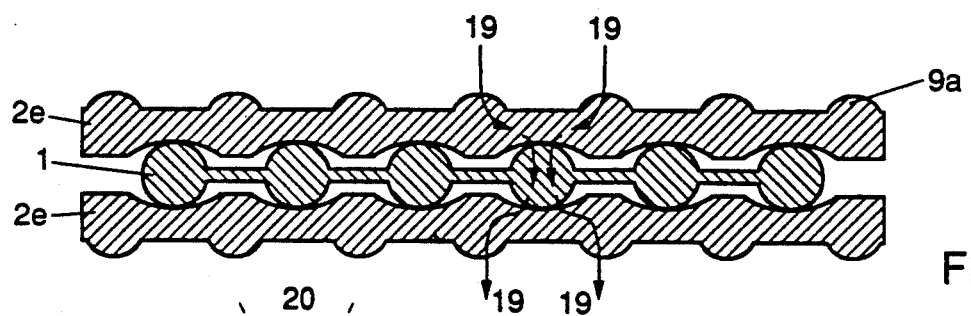

FIGS. 6–8 show embodiments of the vibration damper in which covers 2e are provided with projections 9 on their outer sides away from elastomeric bodies 1.

FIG. 6 additionally shows dish flanges 7 and grooves 8 mating therewith which limit the mutual approach of the dishes 2e and form a dust seal at the edges of the vibration damper. In the embodiment shown the walls of flanges 7 and grooves 8 have different slopes. These may be parallel, however.

FIG. 8 shows an alternative to the boundaries formed by the flanges of covers 2e, namely in the shape of strips 7a and receiving grooves 8a.

Projections 9 in the embodiments of FIGS. 6 and 7 have the shape of studs with flat end faces (see also the left-hand part of FIG. 6). They can be arranged according to the RUBLOC® system. This means that the vibration damper is an improvement of the RUBLOC® vibration damper in that weak vibrations are first received by the softer spherical elastomeric bodies and at an increasing intensity of the vibrations the plate bodies start to function as a RUBLOC® vibration damper. In that configuration, as shown in FIGS. 6 and 8, vibrations are not transferred perpendicularly through the damper, but along a longer, bent path 19.

FIG. 8 shows an embodiment in which projections 9a have the shape of spherical caps. When this vibration damper is placed on a flat base, the spherical caps 9a will show a fair amount of free deformability.

Figure 9:
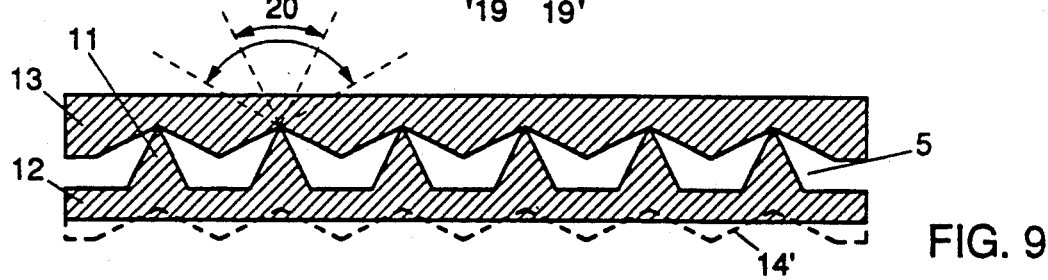
FIG. 9 shows a vibration damper comprising at least two elements.

FIG. 9 is a slightly deviant embodiment, in which the principle of the invention, namely minimum contact and free spaces adjoining the places of contact with increasing volume, is embodied in a two-part vibration damper. Instead of a separate layer of elastomeric bodies being enclosed between two elastomeric plate elements, the elastomeric bodies 11 in this embodiment are connected to an elastomeric plate 12. Plate 12 has conical or pyramidal projections 11 and can cooperate with a second plate 13 with recesses 14, in which projections 11 and recesses 14 have different apical angles 20. Also, a plate 12 can cooperate with a similar plate 12, which has projections 11 on one side and recesses 14' on the other. When the two plates 12 (and 13) are stacked, the projections and the recesses cooperate in the same way as in the embodiments described above, although no distinction can be made here between the hardness of the projections and that of the plates. Through their shape the projections 11 will deform sooner than the plates 12, thereby receiving the weaker vibrations. The elastomeric plates 12 and 13 can be selected so as to have different hardnesses, thereby to vary the damping capacity.

Figure 10:
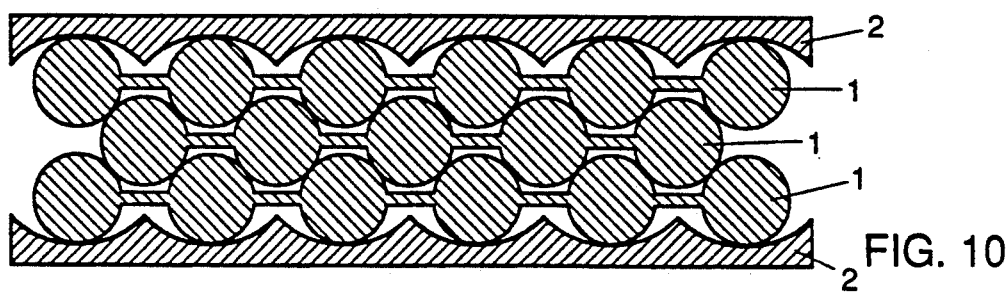
FIG. 10 shows another variant embodiment of the vibration damper shown in FIGS. 1-8.

FIG. 10 shows an embodiment with a plurality of layers of elastomeric bodies 1 between two dishes 2.

The vibration damper according to the invention can excellently be adapted to a large diversity of uses. Not only can the hardnesses of the elastomeric covers 2 and of the elastomeric bodies 1 be geared to each other, but the shapes of the covers, the recesses and the elastomeric bodies can be adapted to suit virtually any purpose. For passive damping (protecting an object against vibrations generated elsewhere) of high-frequency vibrations, for example, soft elastomeric bodies can be used with a pointed configuration, such as a pyramid or a cone with a relatively small apical angle 20. On the other hand spheres of hard material are better suited for active damping (receiving vibrations at the object where the vibrations are generated) of stronger vibrations.

In order to dissipate the heat released when the elastomeric bodies are deformed, the plate elements can be provided with vent openings 15 (see FIG. 3), which need only have small dimensions, since the pumping effect caused by the recurrent mutual approach of the plate elements causes a forced air displacement.

Figure 11:
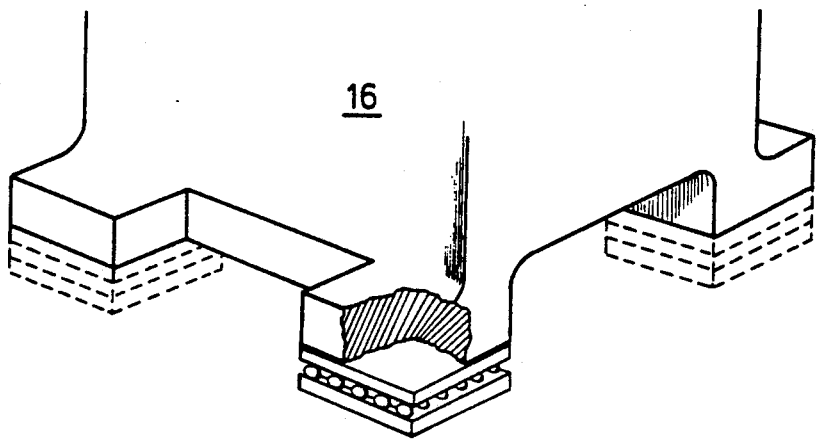
FIGS. 11 and 12 show different uses of vibration dampers according to the invention.

FIG. 11 shows a typical application of the vibration dampers according to the invention, namely under the feet of a machine 16.

Figure 12:
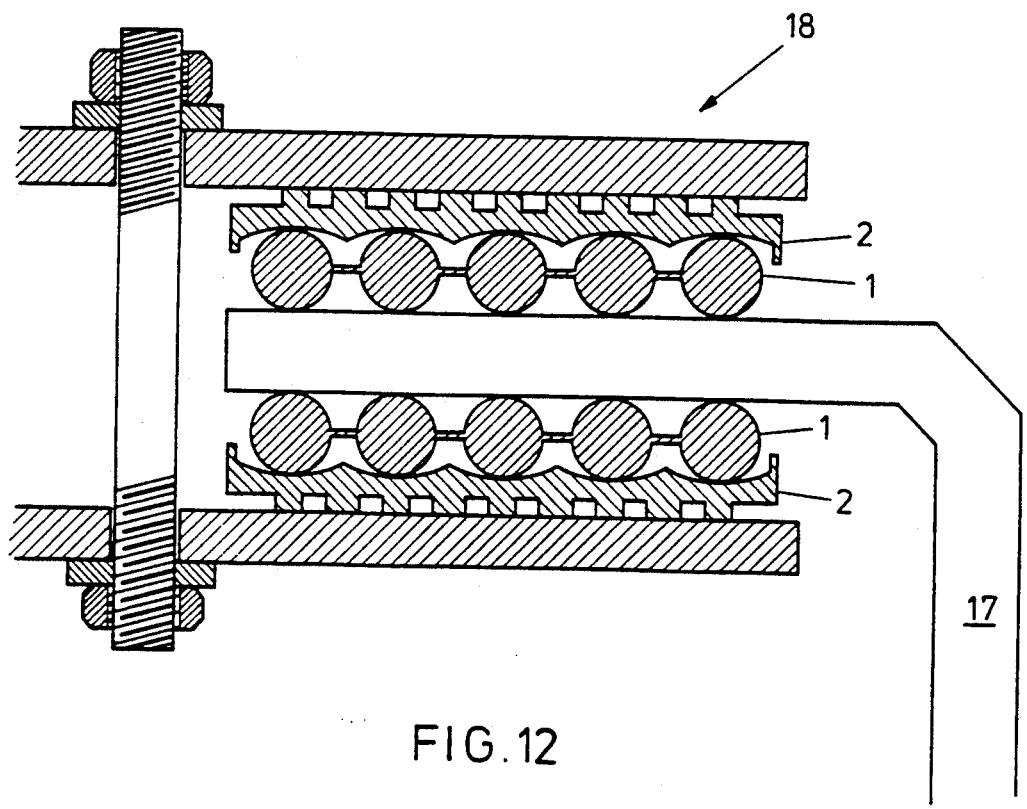

FIG. 12 shows a special use of the vibration damper, namely with a clamped machine part 17. Vibrations generated by this machine part are introduced into the softer elastomeric bodies which through plate elements or covers 2 are clamped in a frame 18. The clamping force can be adjusted, so that by providing a pre-stress an adjustment of the natural frequency of the spheres is possible within certain limits.

I claim:

1. A vibration damper comprising:
at least two elastomeric plate elements having an outer side, an inner side and at least one longitudinal dimension and at least one removably insertable layer of discrete elastomeric bodies sandwiched between said plates, said discrete elastomeric bodies interconnected to each other to prevent rolling of said bodies, said bodies having substantially no longitudinal dimension compared to said at least one longitudinal dimension of said plate elements, said plates being of a different hardness than said bodies and of such a design that lateral movement of said bodies is limited, said bodies being laterally and transversely spaced such that they form a mat of discrete elastomeric bodies that are distributed over said inner sides of said plates, said bodies initially contacting said plates at a point-shaped area of contact when said plates are unloaded, said bodies freely deforming independently from one another and thereby absorbing vibration when said plates are loaded.

2. The vibration damper according to claim 1, wherein said inner sides of said plates face one another and include recesses for receiving said bodies, said recesses having free spaces adjoining every area of contact between said plates and said bodies when said layer of interconnected elastomeric bodies is positioned therebetween, said free space increasing in volume from the areas of contact.

3. The vibration damper according to claim 2, wherein said recesses and said bodies, at least at the areas of contact, each have the shape of parts of solids of revolution with the generatrix of the respective solids of revolution enclosing different angles formed with respect to a plane parallel to said layer of interconnected elastomeric bodies at the areas of contact.

4. The vibration damper according to claim 3, wherein the generatrix of each of said recesses is an ellipsoid and the generatrix of each of said elastomeric bodies is a circle.

5. The vibration damper according to claim 1, wherein said outer sides of said plates include deformable projections, said projections deforming and bending under vibratory loads.

6. The vibration damper according to claim 5, wherein said projections have the shape of a sphere.

7. The vibration damper according to claim 5, wherein said projections have the shape of cylindrical studs having flat end faces, said studs being arranged in groups, said groups having projection with different heights and diameter.

8. The vibration damper according to claim 1, wherein said plates are covers made of an elastomer having a higher hardness than said elastomeric bodies.

9. The vibration damper according to claim 1, wherein said plates contain vent openings.

10. The vibration damper according to claim 1, wherein said vibration damper includes a plurality of layers of interconnected elastomeric bodies positioned one on top of the other, said layers sandwiched between said plates.

11. A vibration damper comprising:
at least two elastomeric plate elements having outer and inner sides and at least one longitudinal dimension, said inner side of one plate including deformable projections each having an apex, said apexes having substantially no longitudinal dimension compared to said at least one longitudinal dimension of said plate elements, said apexes initially contacting recesses located on said inner side of the other plate at a point-shaped area of contact when said plates are unloaded, said projections and said recesses having different configurations such that free spaces are formed at the areas of contact when said plates are loaded, said free spaces increasing in volume from the areas of contact.

12. A vibration damper comprising:
at least two elastomeric plate elements having at least one longitudinal dimension which are made of a material having a first hardness, each of said plates having an inner side with recesses spaced over said inner side for matching alignment with recesses formed in a cooperating plate element, each of said recesses sized and dimensioned to accommodate discrete elastomeric bodies and having an apex through which an assembled-recess axis passes orthogonally to said plates in the assembled condition, each of said plates also having an outer side with load-receiving projections extending therefrom, each of said projections having an apex through which a load-receiving axis passes orthogonally to said plate, each load-receiving axis being laterally offset from each assembled-recess axis whereby the major component of force created upon loading said damper is transmitted non-linearly through said damper so that the amount of vibration absorbed by said damper is increased, and
at least one removably insertable layer of discrete elastomeric bodies sandwiched between said plates, said discrete elastomeric bodies being made of a material having a second hardness which is different from said first hardness and interconnected to each other to prevent rolling of said bodies whereby lateral movement of said bodies with respect to each other is eliminated, said bodies having substantially no longitudinal dimension compared to said at least one longitudinal dimension of said plate elements, said bodies being laterally and transversely spaced such that they form a composite layer of discrete elastomeric bodies which are distributed for receipt in said recesses in said plates, aid bodies initially upon assembly contacting said recesses at a point-shaped area of contact when said plates are assembled but unloaded.

13. The vibration damper according to claim 12, wherein said load-receiving projections have the shape of spheres.

14. The vibration damper according to claim 12, wherein said load-receiving projections have the shape of cylindrical studs, said studs having flat end faces.

15. The vibration damper according to claim 14, wherein other studs are provided with different heights and diameters.

16. The vibration damper according to claim 12, wherein said vibration damper includes a plurality of layers of interconnected elastomeric bodies positioned one on top of the other, said layers sandwiched between said plates.

17. A vibration damper comprising:
at least two elastomeric plate elements having an outer side, an inner side and at least one longitudinal dimension and at least one removably insertable layer of discrete elastomeric bodies sandwiched between said plates, said discrete elastomeric bodies interconnected to each other to prevent rolling of said bodies, said bodies having substantially no longitudinal dimension compared to said at least one longitudinal dimension of said plate elements, said plates being of a different hardness than said bodies and of such a design that lateral movement of said bodies is limited, said bodies being laterally and transversely spaced such that they form a mat of discrete elastomeric bodies that are distributed over said inner sides of said plates, said bodies initially contacting said plates at a line-shaped area of contact when said plates are unloaded, said bodies freely deforming independently from one another and thereby absorbing vibration when said plates are loaded.

18. A vibration damper comprising:
at least two elastomeric plate element having outer and inner sides and at least one longitudinal dimension, said inner side of one plate including deformable projections each having an apex, said apexes having substantially no longitudinal dimension compared to said at least one longitudinal dimension of said plate elements, said apexes initially contacting recesses located on said inner side of the other plate at a line-shaped area of contact when said plates are unloaded, said projections and said recesses having different configurations such that free spaces are formed at the areas of contact when said plates are loaded, said free spaces increasing in volume from the areas of contact.

19. A vibration damper comprising:
at least two elastomeric plate elements having at least one longitudinal dimension which are made of a material having a first hardness, each of said plates having an inner side with recesses spaced over said inner side for matching alignment with recesses formed in a cooperating plate element, each of said recesses sized and dimensioned to accommodate discrete elastomeric bodies and having an apex through which an assembled-recess axis passes orthogonally to said plates in the assembled condition, each of said plates also having an outer side with load-receiving projections extending therefrom, each of said projections having an apex through which a load-receiving axis passes orthogonally to said plate, each load-receiving axis being laterally offset from each assembled-recess axis whereby the major component of force created upon loading said damper is transmitted non-linearly through said damper so that the amount of vibration absorbed by said damper is increased, and
at least one removably insertable layer of discrete elastomeric bodies sandwiched between said plates, said discrete elastomeric bodies being made of a material having a second hardness which is different from said first hardness and interconnected to each other to prevent rolling of said bodies whereby lateral movement of said bodies with respect to each other is eliminated, said bodies having substantially no longitudinal dimension compared to said at least one longitudinal dimension of said plate elements, said bodies being laterally and transversely spaced such that they form a composite layer of discrete elastomeric bodies which are distributed for receipt in said recesses in said plates, aid bodies initially upon assembly contacting said recesses at a line-shaped area of contact when said plates are assembled but unloaded.

* * * * *